(12) United States Patent
Kain

(10) Patent No.: US 6,672,663 B2
(45) Date of Patent: Jan. 6, 2004

(54) RETAINER SYSTEM FOR JUVENILE VEHICLE SEAT

(75) Inventor: James M. Kain, Troy, OH (US)

(73) Assignee: Cosco Management, Inc., Wilmington, DE (US)

( * ) Notice: Subject to any disclaimer, the term of this patent is extended or adjusted under 35 U.S.C. 154(b) by 43 days.

(21) Appl. No.: 09/865,206

(22) Filed: May 24, 2001

(65) Prior Publication Data

US 2002/0043840 A1 Apr. 18, 2002

Related U.S. Application Data

(60) Provisional application No. 60/234,513, filed on Sep. 22, 2000.

(51) Int. Cl.[7] .............................................. A47C 1/08
(52) U.S. Cl. ................................. 297/250.1; 297/463.2
(58) Field of Search ......................... 297/250.1, 256.16, 297/463.2, 463.1

(56) References Cited

U.S. PATENT DOCUMENTS

| | | | |
|---|---|---|---|
| 958,249 A | | 5/1910 | Hirsh |
| 1,825,016 A | | 9/1931 | Salisbury |
| 2,326,328 A | | 8/1943 | Bush |
| 3,136,579 A | | 6/1964 | Hunter |
| 3,695,697 A | | 10/1972 | Stoffel |
| 3,709,558 A | * | 1/1973 | Jakob ................. 297/250.1 |
| 3,968,994 A | | 7/1976 | Chika |
| 4,275,923 A | | 6/1981 | Molnar |
| 4,345,791 A | | 8/1982 | Bryans et al. |
| 4,461,510 A | | 7/1984 | Cunningham et al. |
| 4,463,984 A | | 8/1984 | Molnar |
| 4,481,685 A | | 11/1984 | Watson |
| 4,500,133 A | | 2/1985 | Nakao et al. |
| 4,660,889 A | | 4/1987 | Anthony et al. |
| 4,707,024 A | | 11/1987 | Schrader |
| 4,718,722 A | * | 1/1988 | Kassai ................. 297/250.1 |
| 4,826,246 A | | 5/1989 | Meeker |
| 4,854,639 A | | 8/1989 | Burleigh et al. |
| 5,115,523 A | | 5/1992 | Cone |
| 5,213,393 A | | 5/1993 | Maurer et al. |
| 5,228,746 A | | 7/1993 | Burleigh |
| 5,236,221 A | | 8/1993 | Minami |
| 5,322,343 A | | 6/1994 | Parker et al. |
| 5,458,398 A | | 10/1995 | Meeker et al. |
| 5,524,965 A | | 6/1996 | Barley |
| 5,527,094 A | | 6/1996 | Hiramatsu et al. |
| 5,567,007 A | | 10/1996 | Czernakowski et al. |
| 5,599,060 A | | 2/1997 | Stephens et al. |
| 5,611,596 A | | 3/1997 | Barley et al. |
| 5,733,004 A | | 3/1998 | Celestina-Krevh et al. |
| 5,775,772 A | | 7/1998 | Lefranc |
| 5,810,435 A | | 9/1998 | Surot |
| 5,845,372 A | | 12/1998 | Smith et al. |
| 5,957,531 A | | 9/1999 | Kane et al. |
| 5,964,502 A | | 10/1999 | Stephens |
| 6,000,753 A | | 12/1999 | Cone |
| 6,048,028 A | | 4/2000 | Bapst |
| 6,227,616 B1 | | 5/2001 | Branke et al. |
| 6,382,722 B2 | * | 5/2002 | Burleigh ................. 297/250.1 |

FOREIGN PATENT DOCUMENTS

| | | |
|---|---|---|
| EP | 0 353 377 | 2/1990 |
| EP | 0251242 B1 | 4/1991 |
| EP | 0504618 B1 | 3/1995 |

* cited by examiner

Primary Examiner—Anthony D. Barfield
(74) Attorney, Agent, or Firm—Barnes & Thornburg

(57) ABSTRACT

A juvenile vehicle seat includes a seat, a support base under the seat, a first belt retainer coupled to one side of the support base, and a second seat belt retainer coupled to another side of the support base. To retain the juvenile vehicle seat in place on a first side of a seat in a vehicle, a vehicle shoulder strap associated with that first side of the seat is moved to engage one lower portion of the support base and pass through a channel provided by the first belt retainer so that it extends diagonally behind the juvenile vehicle seat (from left to right) in an "upwardly" sloping direction. Alternatively, to retain the juvenile vehicle seat in place on the other side of a seat in a vehicle, the vehicle shoulder strap associated with that side of the seat is moved to engage another lower portion of the support base and pass through a channel provided by the second belt retainer so that it extends diagonally behind the juvenile vehicle seat (form left to right) in a "downwardly" sloping direction.

24 Claims, 4 Drawing Sheets

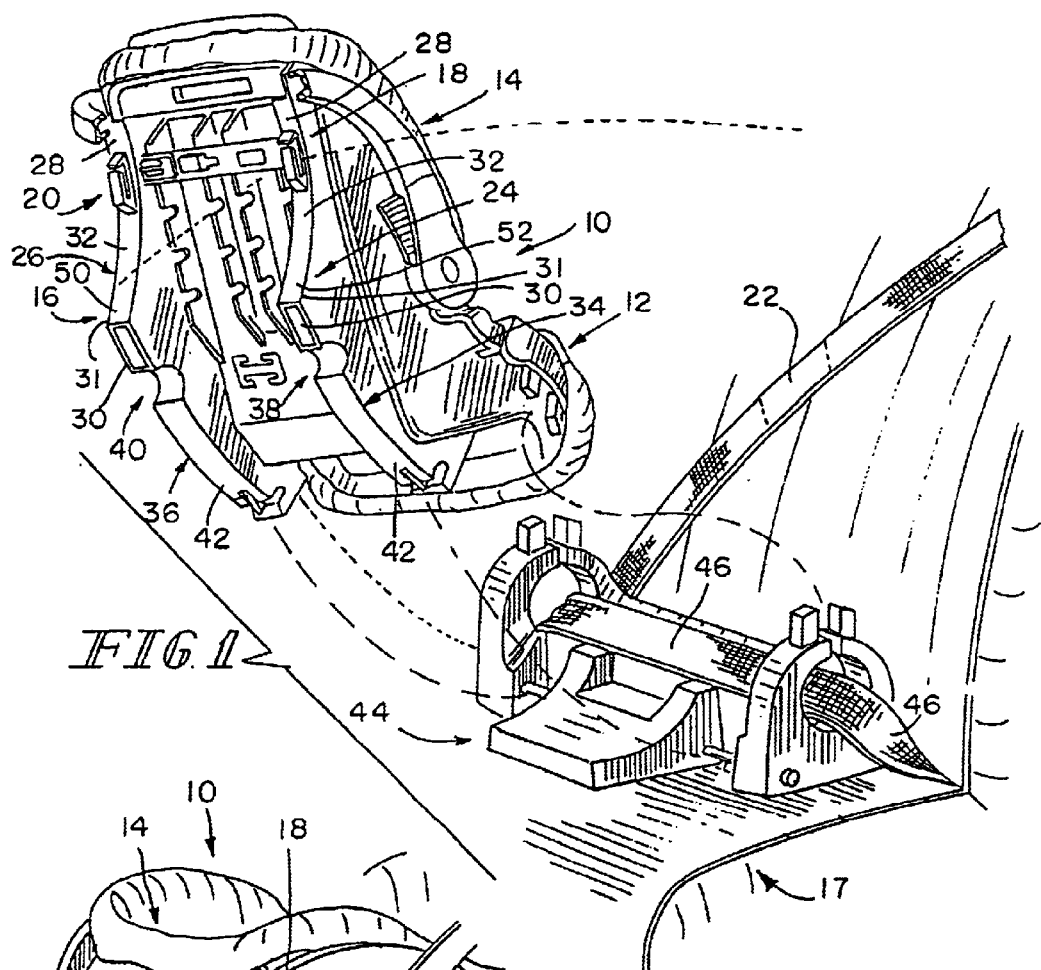
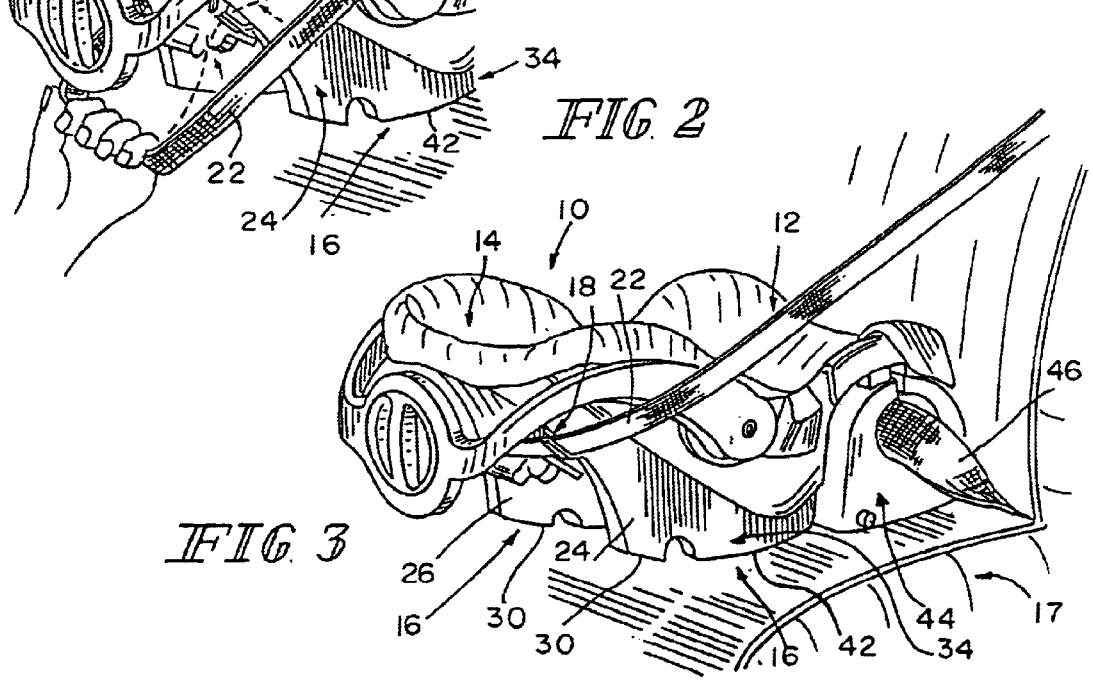

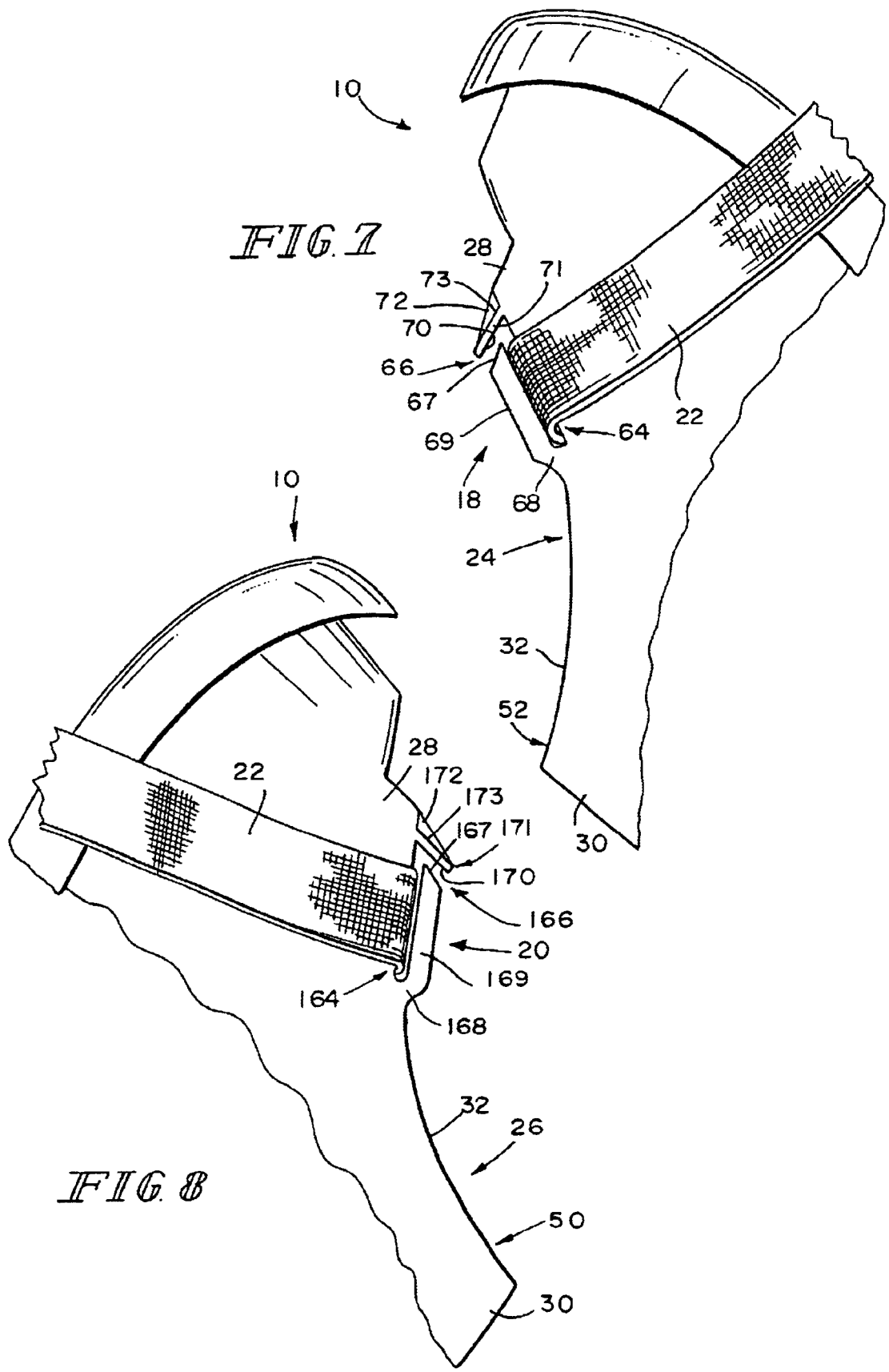

RETAINER SYSTEM FOR JUVENILE VEHICLE SEAT

This application claims priority under 35 U.S.C. 119(e) to U.S. Provisional Application Ser. No. 60/234,513, filed Sep. 22, 2000, which is expressly incorporated by reference herein.

BACKGROUND AND SUMMARY OF THE INVENTION

The present invention relates to juvenile vehicle seats, and particularly to a system for retaining a juvenile vehicle seat in place on a seat in a vehicle. More particularly, the present invention relates to retainers for using vehicle shoulder belts to retain a juvenile vehicle seat in place on a seat in a vehicle.

Juvenile vehicle seats are used to transport infants and other children in automobiles and other vehicles. Vehicle lap and shoulder belts are sometimes used to retain juvenile vehicle seats in place on a seat in a vehicle. See, for example, U.S. Pat, No. 5,527,094 to Hiramatsu et al.; U.S. Pat. No. 6,000,753 to Cone, II; and U.S. Pat. No. 5,957,531 to Kane et al., the disclosures of which are incorporated by reference herein.

According to the present disclosure, a juvenile vehicle seat includes a seat, a support base under the seat, and a first belt retainer coupled to the support base. The first belt retainer includes a belt receiver slot. The first belt retainer is arranged to provide a shoulder belt receiver channel located between the support base and the first belt retainer. In use, a user passes a vehicle shoulder belt into the shoulder belt receiver channel through the belt receiver slot so that the vehicle shoulder belt is positioned to help retain the seat and support base in place on a vehicle seat.

In preferred embodiments, the support base includes two support legs extending downwardly away from the seat back and the first belt retainer is coupled to an upper portion of a first of the support legs to provide the shoulder belt receiver channel. The first belt retainer includes first and second retainer arms that are cantilevered to the upper portion of the first support leg. The free ends of the first and second retainer arms are spaced apart from one another to form the belt receiver slot therebetween.

In certain embodiments, a second belt retainer is coupled to an upper portion of a second of the support legs to provide another shoulder belt receiver channel. The second belt retainer also includes two retainer arms that are cantilevered to the upper portion of the second support leg. The free ends of those two retainer arms are spaced apart from one another to form a belt receiver slot that opens into the second shoulder belt receiver channel.

In practice, only one of the belt retainers will be used at a time to receive a vehicle shoulder belt to help retain the seat and support base in place on the vehicle seat. The first belt retainer will be used with the vehicle shoulder belt on one side of the rear seat in a vehicle while the second belt retainer will be used with the vehicle shoulder belt on the other side of the vehicle's rear seat.

If it is desired to retain the seat and support base in place on one side of the rear seat in a vehicle, the user will (1) pull the vehicle shoulder belt associated with that side of the rear seat away from the seat, (2) pass it into the first shoulder belt receiver channel through the first belt receiver slot, and (3) engage the vehicle shoulder belt on a shoulder belt receiving surface provided on a lower portion of the second support leg. The vehicle shoulder belt is buckled so that it is held fast internally in the shoulder belt receiver channel associated with the first belt retainer and externally on the shoulder belt receiving surface provided on the second support leg to retain the seat in place in the vehicle.

If it is desired to retain the seat and support base in place on the other side of the rear seat of the vehicle, then the process just described is repeated using the vehicle shoulder belt associated with that other side of the vehicle's rear seat, the second belt retainer, and a shoulder belt receiving surface provided on a lower portion of the first support leg. In such a case, the vehicle shoulder belt is buckled so that it is held fast internally in the shoulder belt receiver channel associated with the second belt retainer and externally on the shoulder belt receiving surface provided on the first support leg to retain the seat in place in the vehicle.

Features of the present invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is a perspective view of a juvenile vehicle seat that is about to be mounted on a foundation held in place on a vehicle seat by a lap and shoulder belt restraint, the juvenile vehicle seat including a seat, a support base including left and right support legs under the seat, a first belt retainer on an upper portion of the right support leg, and a second belt retainer on an upper portion of the left support leg;

FIG. 2 is a perspective view similar to FIG. 1 showing a vehicle shoulder belt being pulled away from the vehicle seat by a user so that a portion of the vehicle shoulder belt can be slipped through a belt receiver slot into a shoulder belt receiver channel associated with the first belt retainer on the right support leg;

FIG. 3 is a perspective view similar to FIGS. 1 and 2 showing the vehicle shoulder belt placed in the shoulder belt receiver channel associated with the first belt retainer to help retain the juvenile vehicle seat in place in the vehicle;

FIG. 7 is a partial side elevation view taken along line 7—7 of FIG. 6 showing the vehicle shoulder belt in the channel associated with the first belt retainer on the right support leg and showing the belt receiver slot providing access into the channel; and FIG. 8 is a partial side elevation view of the second belt retainer on the left support leg as it would appear if the vehicle should belt passed through the channel associated with the second belt retainer on the left support leg.

DETAILED DESCRIPTION OF THE DRAWINGS

Figure 4:
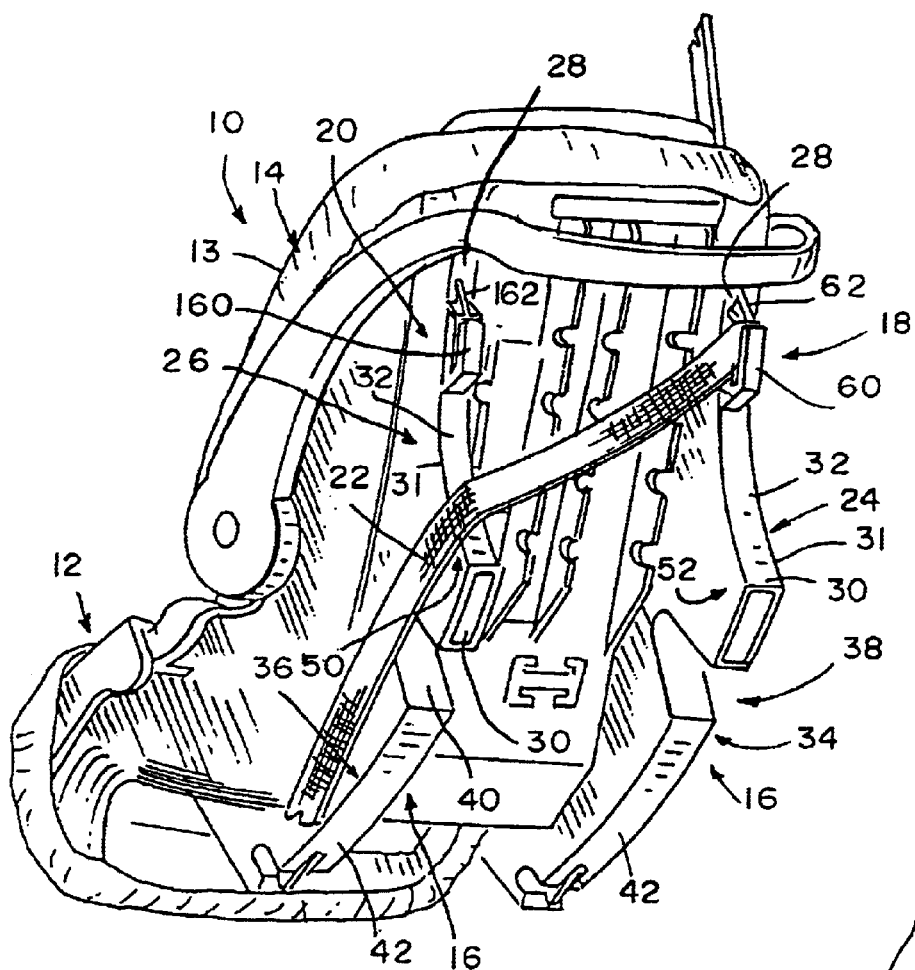
FIG. 4 is an enlarged perspective view of the juvenile vehicle seat of FIGS. 1–3 showing a vehicle shoulder belt held fast internally in the shoulder belt receiver channel associated with the first belt retainer on an upper portion of the right support leg and externally on a shoulder belt receiving surface provided on a lower portion of the second support leg to retain the juvenile vehicle seat in place in the vehicle.

A juvenile vehicle seat 10 includes a seat bottom 12, sides 13 and a seat back 14 extending away from seat bottom 12. A support base 16 is appended to an underside of seat 10 as shown, for example, in FIG. 1 and adapted to rest on a seat 17 in a vehicle as shown, for example, in FIG. 3. First and second belt retainers 18, 20 are coupled to support base 16 as shown, for example, in FIGS. 1 and 4 and used, one at a time, to receive a vehicle shoulder belt 22 to help retain the juvenile vehicle seat 10 in place on seat 17.

Support base 16 includes first and second legs 24, 26 extending away from seat back 14 as shown in FIGS. 1 and 4. Each support leg 24, 26 includes an upper portion 28 lying adjacent to seat back 14 and a foot portion 30 lying away from seat back 14. Foot portions 30 are adapted to seat on a vehicle seat or other foundation. Each support leg 24, 26 includes a concave curved rear edge 32 as shown best in FIG. 4 extending from upper portion 28 to foot portion 30.

Support base 16 also includes first and second support members 34, 36 as shown in FIGS. 1 and 4. First support member 34 is located under seat bottom 12 on one side of seat 10 and in spaced-apart relation to first support leg 24 to define a first notch 38 therebetween. Second support member 36 is located under seat bottom 12 on another side of seat 10 and in spaced-apart relation to second support leg 26 to define a second notch 40 therebetween. Each support member 34, 36 includes an elongated convex bottom edge 42 as shown best in FIGS. 1 and 4.

Seat foundation 44 is adapted to set on vehicle seat 17 and help anchor juvenile seat 10 in place on vehicle seat 17 using vehicle lap belt 46 as shown, for example, in FIGS. 1 and 3. Reference is hereby made to U.S. application Ser. No. 09/825,035, filed Apr. 3, 2001, for further description of seat foundation 44, which disclosure is hereby incorporated by reference herein. Reference is also made to U.S. application Ser. No. 09/751,107, filed Dec. 29, 2000, for descriptions of other suitable seat foundations, which disclosure is also hereby incorporated by reference herein.

In use, there are two options available to a user for coupling vehicle shoulder belt 22 to juvenile vehicle seat 10 to help retain seat 10 in place in the vehicle. First, the vehicle shoulder belt 22 can pass through first belt retainer 18 and over a shoulder belt receiver surface 50 provided on second leg 26 of support base 16 as shown, for example, in FIGS. 4 and 6. Alternatively, shoulder belt 22 can pass through second belt retainer 20 and over a shoulder belt receiver surface 52 provided on first leg 24 of support base 16 as suggested by phantom line 54 in FIG. 6.

Figure 6:
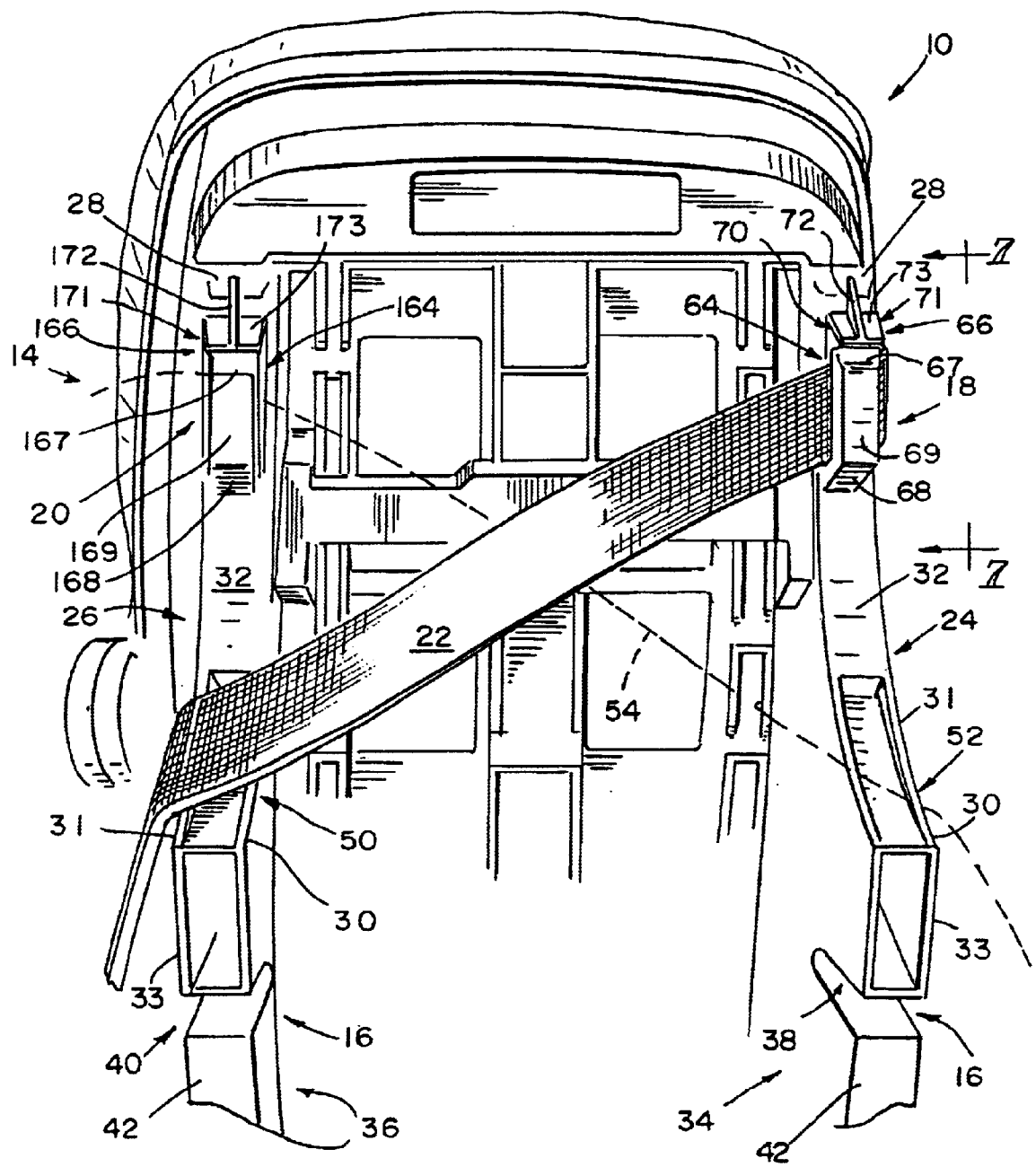
FIG. 6 is an enlarged rear elevation view of the seat and vehicle shoulder belt in the condition also shown in FIGS. 3 and 4.

If one were to look at shoulder belt 22 from the point of view shown in FIG. 6, one might say that shoulder belt 22 is constrained (1) to slope "positively" (i.e., incline from left to right) when passed through first belt retainer 18 and over shoulder belt receiver surface 50 on second leg 26 and (2) to slope "negatively" (i.e., decline from left to right) when passed through second belt retainer 20 and over shoulder belt receiver surface 52 on first leg 24. Normally, a user would opt to use first belt retainer 18 to receive vehicle shoulder belt 22 if the user wanted to mount juvenile vehicle seat 10 in place on the left side of the back seat 17 of a vehicle (i.e., behind the driver). The user would opt to use second belt retainer 20 to receive vehicle shoulder belt 22 if the user wanted to mount juvenile vehicle seat 10 in place on the right side of the back seat 17 of a vehicle (i.e., behind the front seat passenger).

Figure 5:
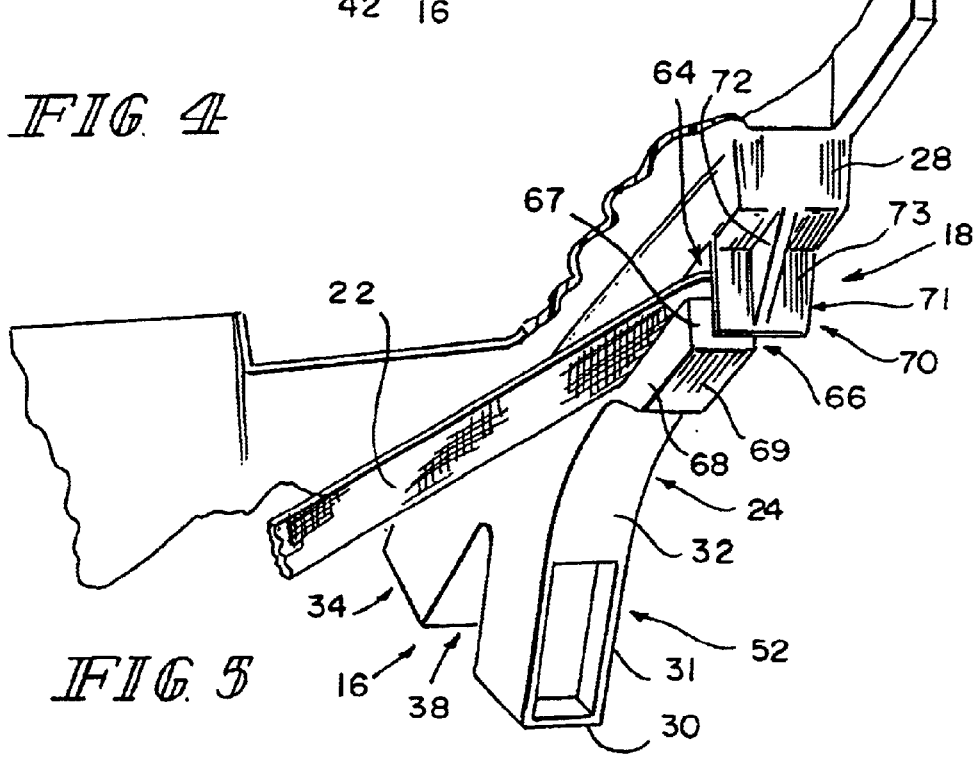
FIG. 5 is an enlarged perspective view of the first belt retainer on the upper portion of the right support leg showing the vehicle shoulder belt passing through the shoulder belt receiver channel provided between the first belt retainer and right support leg and showing a belt receiver slot located to provide access to the shoulder belt receiver channel so that a user can pass the vehicle shoulder belt through the slot to reach the channel.

First belt retainer 18 includes first and second retainer arms 60, 62 cantilevered to upper portion 28 of first support leg 24 as shown in FIGS. 4–6. A shoulder belt receiver channel 64 is located between upper portion 28 of first support leg 24 and retainer arms 60, 62 and sized to receive shoulder belt 22 therein.

A belt receiver slot 66 is formed in first belt retainer 18 so that a user can pass vehicle shoulder belt 22 into shoulder belt receiver channel 64 through belt receiver slot 66 (which opens into shoulder belt receiver channel 64.) In the illustrated embodiment, belt receiver slot 66 is located between distal end 67 of first retainer arm 60 and distal end 70 of second retainer arm 62 to facilitate movement of vehicle shoulder belt 22 into and out of shoulder belt receiver channel 64 adjacent to first support leg 24.

First retainer arm 60 also includes an angled root portion 68 anchored to first support leg 24 and an elongated retainer portion 69 extending from a distal end of angled root portion 68 to provide distal end 67 of first retainer arm 60 as shown in FIGS. 4, 6, and 7. Second retainer arm 62 includes a panel 71 anchored at one end to upper portion 28 of first support leg 24 and a rigidifying rib 72 coupled to upper portion 28 and to a rear wall 73 of panel 71. Rigidifying rib 72 is arranged to lie in perpendicular relation to panel 71 and rigidify panel 71. Panel 71 provides the distal end 70 of second retainer arm 62 and is spaced apart from distal end 67 of first retainer arm 60 to form belt receiver slot 66 therebetween.

Second belt retainer 20 includes first and second retainer arms 160, 162 cantilevered to upper portion 28 of second support leg 26 as shown in FIGS. 4–6. A shoulder belt receiver channel 164 is located between upper portion 28 of second support leg 26 and retainer arms 160, 162 and sized to receive shoulder belt 22 therein.

A belt receiver slot 166 is formed in second belt retainer 20 so that a user can pass vehicle shoulder belt 22 into shoulder belt receiver channel 164 through belt receiver slot 166 (which opens into shoulder belt receive channel 164). In the illustrated embodiment, belt receiver slot 166 is located between distal end 167 of first retainer arm 60 and distal end 170 of second retainer arm 162 to facilitate movement of vehicle shoulder belt 22 into and out of shoulder belt receiver channel 164 adjacent to second support leg 26.

First retainer arm 160 also includes an angled root portion 168 anchored to second support leg 26 and an elongated retainer portion 169 extending from a distal end of angled root portion 168 to provide distal end 167 of first retainer arm 160 as shown in FIGS. 4, 6, and 8. Second retainer arm 162 includes a panel 171 anchored at one end to upper portion 28 of second support leg 26 and a rigidifying rib 172 coupled to upper portion 28 and to a rear wall 173 of panel 171. Rigidifying rib 172 is arranged to lie in perpendicular relation to panel 171 and rigidify panel 171. Panel 171 provides the distal end 170 of second retainer arm 160 and is spaced apart from distal end 167 of first retainer arm 160 to form belt receiver slot 166 therebetween.

As shown, for example, in FIG. 6, foot portion 30 of second support leg 26 includes an exterior wall providing a shoulder belt receiver surface 50 adapted to engage a portion of vehicle shoulder belt 22. Likewise, foot portion 30 of first support leg 24 includes an exterior wall providing a shoulder belt receiver surface 52 adapted to engage a portion of vehicle shoulder belt 22. In the illustrated embodiment, such shoulder belt receiver surfaces 50, 52 are defined by an edge 31 shared by rear wall 32 of each support leg 24, 26 and a side wall 33 (of each support leg 24, 26) lying at an angle to the rear wall 32.

In use, when vehicle shoulder belt 22 is used to mount juvenile vehicle seat 10 in place on the left side of back seat 17 of a vehicle (behind the driver), first belt retainer 18 and shoulder belt receiver surface 50 on second support leg 26 cooperate to provide first means for receiving a vehicle shoulder belt 22 extending in a positively sloping direction internally in an open-ended shoulder belt receiver channel 64 adjacent to first support leg 24 and externally on the shoulder belt receiver surface 50 on second support leg 26 to retain juvenile vehicle seat 10 in place in a vehicle. Alternatively, when vehicle shoulder belt 22 is used to mount juvenile vehicle seat 10 in place on the right side of back seat 17 of a vehicle (behind the front seat passenger), second belt retainer 20 and shoulder belt receiver surface 52 on first support leg 24 cooperate to provide second means for receiving a vehicle shoulder belt 22 extending in a negatively sloping direction internally in an open-ended shoulder belt receiver channel 164 adjacent to second support leg 26 and externally on the shoulder belt receiver surface 52 on first support leg 24 to retain juvenile vehicle seat 10 in place in a vehicle.

Although the invention has been described in detail with reference to certain preferred embodiments, variations and modifications exist within the scope and spirit of the invention as described and defined in the following claims.

What is claimed is:

1. A juvenile vehicle seat comprising a seat including a seat bottom and seat back extending away from the seat bottom, a support base appended to an underside of the seat, arranged to lie behind the seat back and adapted to support the seat on a surface underlying the seat, and a first belt retainer coupled to the support base on an underside of the seat back and arranged to provide a shoulder belt receiver channel located between the support base and the first belt retainer and adapted to receive only a vehicle shoulder belt therein to retain the seat in place in a vehicle, the first belt retainer being formed to include a belt receiver slot opening into the shoulder belt receiver channel adjacent to the support base to facilitate movement of a vehicle shoulder belt into and out of the shoulder belt receiver channel, wherein the support base includes first and second support legs extending away from the seat back, each support leg includes an upper portion lying adjacent to the seat back and a foot portion lying away from the seat back, each foot portion includes an exterior wall providing a shoulder belt receiver surface adapted to engage a vehicle shoulder belt, the first belt retainer is coupled to the upper portion of the first support leg, and the first belt retainer and the shoulder belt receiver surface on the external wall of the second support leg cooperate to provide means for receiving a vehicle shoulder belt internally in the shoulder belt receiver channel adjacent to the first support leg and externally on the shoulder belt receiver surface on the second support leg to retain the seat in place in a vehicle.

2. The vehicle seat of claim 1, wherein the first belt retainer includes first and second retainer arms cantilevered to the upper portion of the first support leg, the first and second retainer arms and the upper portion of the first support leg cooperate to define the shoulder belt receiver channel adjacent to the first support leg, and the first and second retainer arms cooperate to form therebetween the belt receiver slot.

3. The vehicle seat of claim 2, wherein the first retainer arm includes an angled root portion anchored to the first support leg and an elongated retainer portion extending from a distal end of the angled root portion toward a distal end of the second retainer arm to define the shoulder belt receiver slot therebetween.

4. The vehicle seat of claim 2, wherein the exterior wall of the second support leg includes a rear wall facing away from the seat back and a side wall lying at an angle to the rear wall and wherein the side wall and rear wall cooperate to provide an edge defining the shoulder belt receiver surface.

5. The vehicle seat of claim 4, wherein the edge is curved along the length of the second support leg.

6. The vehicle seat of claim 1, further comprising a second belt retainer coupled to the upper portion of the second support leg and wherein the second belt retainer and the shoulder belt receiver on the external wall of the first support leg cooperate to provide means of receiving a vehicle shoulder belt internally in a shoulder belt receiver channel adjacent to the second support leg and externally on the shoulder belt receiver surface on the first support leg to retain the seat in place in a vehicle.

7. The vehicle seat of claim 6, wherein the support base further includes a first support member located under the seat bottom on one side of the seat and in spaced-apart relation to the first support leg to define a first notch therebetween and a second support member located under the seat bottom on another side of the seat and in spaced-apart relation to the second support leg to define a second notch therebetween.

8. A juvenile vehicle seat comprising a seat including a seat bottom and seat back extending away from the seat bottom a support base appended to an underside of the seat and adapted to support the seat on a surface underlying the seat, a first belt retainer coupled to the support base and arranged to provide a shoulder belt receiver channel located between the support base and the first belt retainer and adapted to receive only a vehicle shoulder belt therein to retain the seat in place in a vehicle, the first belt retainer being formed to include a belt receiver slot opening into the shoulder belt receiver channel adjacent to the support base to facilitate movement of a vehicle shoulder belt into and out of the shoulder belt receiver channel, and a second belt retainer coupled to the support base and arranged to provide a shoulder belt receiver channel between the support base and the second belt retainer and wherein the second belt retainer is adapted to receive only a vehicle shoulder belt therein to retain the seat in place in a vehicle and the second belt retainer is formed to include a second belt receiver slot opening into the shoulder belt receiver channel adjacent to the second support leg to facilitate movement of the vehicle shoulder belt into and out of the shoulder belt receiver channel adjacent to the second support leg and wherein each of the first and second belt retainers also includes a second retainer arm coupled to the support base and arranged to lie in spaced-apart relation to a companion one of the first retainer arms to define one of the belt receiver slots therebetween.

9. The vehicle seat of claim 8, wherein each second retainer arm includes a panel facing toward the companion one of the retainer arms and a rigidifying rib coupled to the support base and a rear wall of the panel to position the panel between the rigidifying rib and said companion one of the retainer arms and arranged to lie in perpendicular relation to the rear wall of the panel.

10. A juvenile vehicle seat comprising a seat including a seat bottom, a seat back extending away from the seat bottom and having an upper edge, and a pair of spaced-apart sides arranged to position the seat bottom therebetween, first and second support legs appended to an underside of the seat back and adapted to support the seat on a surface underlying the seat, each of the first and second support legs being coupled to the seat back to lie in spaced-apart relation to the sides and including an upper portion lying adjacent to the upper edge of the seat back and a foot portion arranged to lie below the upper portion and adapted to support a portion of the seat on a surface underlying the seat, a first belt retainer coupled to the upper portion of the first support leg at a surface behind the seat back and arranged to provide an open-ended first shoulder belt receiver channel located between the first support leg and the first belt retainer and near the upper edge of the seat back, and a second belt retainer coupled to the upper portion of the second support leg at a surface behind the seat back and arranged to provide an open-ended second shoulder belt receiver channel located between the second support leg and the second belt retainer and near the upper edge of the seat back.

11. A juvenile vehicle seat comprising:

a seat including a seat bottom and a seat back extending away from the seat bottom and having an upper edge, first and second support legs appended to an underside of the seat back and adapted to support the seat on a surface underlying the seat, each of the first and second support legs including an upper portion lying adjacent to the upper edge of the seat back and a foot portion arranged to lie below the upper portion and adapted to support a portion of the seat on a surface underlying the seat, a first belt retainer coupled to the upper portion of the first support leg and arranged to provide an open-ended first shoulder belt receiver channel located between the first support leg and the first belt retainer and near the upper edge of the seat back, and a second belt retainer coupled to the upper portion of the second support leg and arranged to provide an open-ended second shoulder belt receiver channel located between the second support leg and the second belt retainer and near the upper edge of the seat back, wherein each foot portion includes an exterior wall providing a shoulder belt receiver surface adapted to engage a vehicle shoulder belt, the first belt retainer and the shoulder belt receiver surface on the second support leg cooperate to provide first means for receiving a vehicle shoulder belt extending in a positively sloping direction internally in the open-ended shoulder belt receiver channel adjacent to the first support leg and externally on the shoulder belt receiver surface on the second support leg to retain the seat in place in a vehicle when the seat is positioned to be retained by a positively sloping vehicle shoulder belt, and the second belt retainer and the shoulder belt receiver surface on the first support leg cooperate to provide second means for receiving a vehicle shoulder belt extending in a negatively sloping direction internally in the open-ended shoulder belt receiver channel adjacent to the second support leg and externally on the shoulder belt receiver surface on the first support leg to retain the seat in place in a vehicle when the seat is positioned to be retained by a negatively sloping vehicle shoulder belt.

12. The vehicle seat of claim 11, wherein each support leg includes a rear wall facing away from the seat back and a side wall lying at an angle to the rear wall and wherein the side wall and the rear wall cooperate to provide an edge defining the shoulder belt receiver surface.

13. The vehicle seat of claim 12, wherein each edge is curved along a length portion thereof.

14. The vehicle seat of claim 10, wherein the seat back includes a top edge, the first belt retainer includes a first retainer arm cantilevered at one end to the first support leg and having another end arranged to extend upwardly from the first support leg along the seat back toward the top edge of the seat back, and the second belt retainer includes a second retainer arm cantilevered at one end to the second support leg and having another end arranged to extend upwardly from the second support leg along the seat back toward the top edge of the seat back.

15. The vehicle seat of claim 14, wherein the first retainer arms of the first and second belt retainers are arranged to lie in spaced-apart parallel relation to one another.

16. A juvenile vehicle seat comprising a seat including a seat bottom and a seat back extending away from the seat bottom and having an upper edge, first and second support legs appended to an underside of the seat back and adapted to support the seat on a surface underlying the seat, each of the first and second support legs including an upper portion lying adjacent to the upper edge of the seat back and a foot portion arranged to lie below the upper portion and adapted to support a portion of the seat on a surface underlying the seat, a first belt retainer coupled to the upper portion of the first support leg and arranged to provide an open-ended first shoulder belt receiver channel located between the first support leg and the first belt retainer and near the upper edge of the seat back, and a second belt retainer coupled to the upper portion of the second support leg and arranged to provide an open-ended second shoulder belt receiver channel located between the second support leg and the second belt retainer and near the upper edge of the seat back, wherein the seat back includes a top edge, the first belt retainer includes a first retainer arm cantilevered at one end to the first support leg and having another end arranged to extend upwardly from the first support leg along the seat back toward the top edge of the seat back, and the second belt retainer includes a second retainer arm cantilevered at one end to the second support leg and having another end arranged to extend upwardly from the second support leg along the seat back toward the top edge of the seat back and the first belt retainer further includes a second retainer arm coupled to the first support leg and arranged to lie in spaced-apart relation to said another end of the first retainer arm of the first belt retainer to define a belt receiver slot therebetween providing an access opening into the open-ended shoulder belt receiver channel located between the first support leg and the first belt retainer and the second belt retainer further includes a second retainer arm coupled to the second support leg and arranged to lie in spaced-apart relation to said another end of the first retainer arm of the second belt retainer to define a belt-receiver slot therebetween providing an access opening into the open-ended shoulder belt receiver channel located between the second support leg and the second belt retainer.

17. A juvenile vehicle seat comprising a seat including a seat bottom and a seat back extending away from the seat a support base appended to the underside of the seat and adapted to support the seat on a surface underlying the seat, and a first retainer arm cantilevered to the support base to define a shoulder belt receiver channel located between the support base and the first retainer arm and adapted to receive only a vehicle shoulder belt therein to retain the seat in place in a vehicle, and a second retainer arm cantilevered to the support base and arranged to lie in spaced-apart relation to the support base to define a belt receiver slot opening into the belt receiver channel to facilitate movement of a vehicle shoulder belt into and out of the shoulder belt receiver channel, wherein the first retainer arm includes an angled root portion anchored to the support base and an elongated retainer portion extending from a distal end of the angled root portion toward a distal end of the second retainer arm to define the belt receiver slot therebetween.

18. A juvenile vehicle seat comprising a seat including a seat bottom and a seat back extending away from the seat bottom, a support base appended to the underside of the seat and adapted to support the seat on a surface underlying the seat, and a first retainer arm cantilevered to the support base to define a shoulder belt receiver channel located between the support base and the first retainer arm and adapted to receive only a vehicle shoulder belt therein to retain the seat in place in a vehicle, and a second retainer arm cantilevered to the support base and arranged to lie in spaced-apart relation to the support base to define a belt receiver slot opening into the belt receiver channel to facilitate movement of a vehicle shoulder belt into and out of the shoulder belt receiver channel, wherein the second retainer arm includes a panel facing toward a distal end of the first retainer arm and a rigidifying rib coupled to the support base and a rear wall of the panel to position the panel between the rigidifying rib and the distal end of the first retainer arm.

19. A juvenile vehicle seat comprising a seat including a seat bottom and seat back extending away from the seat bottom, a support base appended to an underside of the seat and adapted to support the seat on a surface underlying the seat, and a first belt retainer coupled to the support base and arranged to provide a shoulder belt receiver channel located between the support base and the first belt retainer and adapted to receive only a vehicle shoulder belt therein to retain the seat in place in a vehicle, the first belt retainer being formed to include a belt receiver slot opening into the shoulder belt receiver channel adjacent to the support base to facilitate movement of a vehicle shoulder belt into and out of the shoulder belt receiver channel adjacent to the support base, wherein the first belt retainer includes first and second retainer arms cantilevered to an upper portion of the support base, the first and second retainer arms and the upper portion of the support base cooperate to define the shoulder belt receiver channel adjacent to the support base, and the first and second retainer arms cooperate to form therebetween the belt receiver slot.

20. The vehicle seat of claim 19, wherein the first retainer arm includes an angled root portion anchored to the support base and an elongated retainer portion extending from a distal end of the angled root portion toward a distal end of the second retainer arm to define the shoulder belt receiver slot therebetween.

21. The vehicle seat of claim 19, including a support leg coupled to the support base and having a rear wall facing away from the seat back and a side wall lying at an angle to the rear wall and wherein the side wall and rear wall cooperate to provide an edge defining a shoulder belt receiver surface.

22. The vehicle seat of claim 21, wherein the edge is curved along the length of the support leg.

23. The vehicle seat of claim 19, further comprising a second belt retainer coupled to the support base and arranged to provide a shoulder belt receiver channel between the support base and the second belt retainer and wherein the second belt retainer is adapted to receive only a vehicle shoulder belt therein to retain the seat in place in a vehicle and the second belt retainer is formed to include a second belt receiver slot opening into the shoulder belt receiver channel adjacent to a support leg to facilitate movement of the vehicle shoulder belt into and out of the shoulder belt receiver channel adjacent to the support leg, the seat back includes a top edge and each of the first and second belt retainers includes a first retainer arm cantilevered at one end to the support base and having another end arranged to extend upwardly from the support base along the seat back toward the top edge of the seat back, and the second belt retainer includes a second retainer arm coupled to the support base and arranged to lie in spaced-apart relation to a companion first retainer arm to define a belt receiver slot therebetween.

24. The vehicle seat of claim 23, wherein each second retainer arm includes a panel facing toward the companion one of the retainer arms and a rigidifying rib coupled to the support base and a rear wall of the panel to position the panel between the rigidifying rib and said companion one of the retainer arms and arranged to lie in perpendicular relation to the rear wall of the panel.

* * * * *